INVENTORS
RAYMOND SAUVENIERE,
GILBERT DOQUIRE

United States Patent Office 3,490,982
Patented Jan. 20, 1970

3,490,982
METHOD OF MODIFYING THE LIGHT REFLECTING PROPERTIES OF GLASS AND GLASS PRODUCED THEREBY
Raymond Sauveniere, Rijsbergdijk, Balen, Nette, and Gilbert Doquire, Spy, Belgium, assignors to S. A. Glaverbel, Brussels, Belgium
Filed Aug. 24, 1966, Ser. No. 574,596
Claims priority, application Luxembourg, Aug. 24, 1965, 49,381
Int. Cl. C03c 17/22, 25/06
U.S. Cl. 161—1   11 Claims

ABSTRACT OF THE DISCLOSURE

A glass surface is treated to reduce specular reflection therefrom by (a) wetting the surface uniformly and to a minimum extent and (b) causing minute droplets to impinge or form against such surface, the droplets being of a substance which reacts chemically with the glass. Marks of the chemical attack are microscopically visible at a multiplicity of spots distributed over the surface. A glass surface so prepared can be used to make a mold from which similar glass surfaces can be reproduced.

---

The present invention relates to a method of modifying the light reflecting properties of glass, and more particularly, to a method of modifying the light reflecting properties of sheet glass and modified products obtained thereby.

It is well known that when visible light is incident upon a transparent glass sheet, some of the light is reflected at the air-glass and glass-air interfaces. The proportion of the incident light transmitted by the glass may exceed 90% if the sheet is sufficiently thin since the amount of light reflected at each interface is only about 4%. This so-called specular reflection is of little significance in the case of glass sheets used in ordinary window glazings, as well as in other situations where the objects that are to be viewed through the glass are reasonably spaced from the glass and reflect or emit an appreciable amount of light.

However, there are instances in which the specular reflection is very disadvantageous, for example, the glass in picture frames. In such cases the object to be viewed is close to the glass and the picture is illuminated entirely by light transmitted through the glass. Some of the light reaching the picture is absorbed by the picture, therefore, the greater the amount of light which is so absorbed, the greater is the adverse significance of the loss of about 10% of the potentially useful illumination by specular reflection. In situations where the illuminating light incident upon the glass emanates from a relatively bright source, e.g., a window or a lamp, or even the observer himself, the specularly reflected light may be more intense than the light reflected from the picture with the result that an image of the light source obscures the picture itself. The same phenomenon is observed when viewing television pictures through the protective glass plate in a television set as well as when viewing instrument dials through protective glasses.

Specular reflection is also responsible for the inconvenient phenomena sometimes encountered when viewing a surface through a lens. In such cases, Newton rings appear due to interference between the reflected rays. This interference is likely to occur wherever viewing is affected by out-of-phase reflected light rays; it can thus occur, e.g., when viewing photographic "diapositives" due to the glass sheet and photographic film not being in strict parallel relationship, when viewing objects through a glass sheet with non-parallel faces, or through a double glazing unit with non-parallel panes, or when viewing objects through glass sheets bearing grease smears.

The prior art has suggested various methods of treating glass to reduce specular reflection. For example, it is known to apply a surface coating to glass for this purpose. However, these coatings suffer from the disadvantage that they are easily spoiled by scratching. Moreover, the coatings are inherently colored, and for this reason the coating method can not be utilized for treating glasses which must transmit all colors in the light spectrum to substantially the same extent.

In addition, the treatment of glass with hydrofluoric acid reduces or eliminates specular reflection, therefore, this method is only suitable for engraving glass since the treatment makes the glass surface white and nearly opaque.

Still another known method of treating glass comprises immersing the glass in a concentrated solution of hydrofluoric acid containing a fluoride. However, it has not been found possible by this method to achieve a truly uniform modification of glass surfaces under industrial conditions. The surfaces must be absolutely dry at the moment of entering the solution, and any lack of homogeneity of the bath, or the presence of any convection currents therein is likely to result in irregularities in the treatment. Moreover, it is virtually impossible to avoid in the treated glass surfaces, the appearance of horizontal and vertical lines which result from movement of the glass through the liquid during withdrawal from the bath, and subsequent running of surplus liquid down the treated surfaces.

It has now been found, however, that by the process of the present invention, it is possible to treat glass surfaces to reduce specular reflection on an industrial scale without coloring the glass surface. The method, broadly defined, comprises uniformly wetting the glass surface, and while the surface is wet but bears no excess wetting liquid, causing minute droplets of a substance which reacts chemically with the glass to impinge or form against the surface wherein a chemical reaction occurs. As a result of the reaction, marks of the chemical attack at a multiplicity of spots distributed over the surface of the glass can be seen when the same is subsequently viewed under a microscope.

It is, therefore, a principal object of the present invention to provide a process for modifying the light-reflecting properties of glass and a product produced thereby which process and product are free from the inherent deficiencies and disadvantages of the prior art.

A further object of the present invention is to provide a process for treating glass surfaces to reduce specular reflection without coloring of the glass surface.

The process of the present invention comprises wetting a glass surface, and while such surface is wet but bears no excess wetting liquid, causing minute droplets of a substance which is chemically reactive with the glass to impinge or form against the surface of the glass and chemically react therewith. As a result, the glass contains a multiplicity of marks of chemical attack distributed over its surface, which marks are such as to be visible with the aid of a microscope.

A yet further object of the present invention is to provide such a process wherein a glass surface is impacted or impinged by minute droplets of a substance which is chemically reactive with the glass while such glass is wet but bears no excess wetting liquid.

A still further object of the present invention is to provide glass surfaces bearing marks of chemical attack at a multiplicity of spots distributed over such surface and visible under a microscope.

Still further objects and advantages of the process and product of the present invention will become more apparent from the following more detailed description of the invention.

The present invention also includes any piece of glass wherein at least one surface bears marks of chemical attack at a multiplicity of spots distributed over the said surface and visible under a microscope. The chemically affected spots resulting from performance of the method as hereinafter exemplified are depressions which are circular or nearly circular in shape and a large proportion of the spots overlap one or more adjacent spots. The diameters of the spots are of the same order of sizes as the droplets which impact against the glass. Preferably, the spots have diameters or means diameters of from 10 to 300 microns and maximum depths of from 0.1 to 1 micron.

As the invention is more particularly intended for treating sheet glass, whether curved or flat, it will be hereafter described with reference to this embodiment.

In accordance with the present invention, a glass sheet can be treated on one face, or surface only, or on both faces of the sheet. In the case wherein only one face is treated when the glass is installed, e.g., in a picture frame or over an instrument dial, the glass should be placed with the treated surface towards the observer. A treatment of both faces or surfaces may, in some instances, be more advantageous.

The manner in which the surface is wetted should be carefully selected, taking into consideration the composition of the wetting liquid, that is, the wetting liquid must not attack the glass to any significant extent. If a chemically neutral liquid, e.g., distilled water, is used, then it may be liberally applied initially. This is useful for washing away any dust particles. If the liquid does not have to exercise any washing action, the wetting of the surface can be achieved merely by placing the glass sheet in an atmosphere such as air saturated, or super-saturated, with the liquid. This procedure is thus suitable if the glass surface is particularly clean, as, for instance in the case when the glass has only just left the drawing pit or annealing lehr of a flat glass drawing machine. It is a recommended procedure in the event that the wetting liquid used consists of, or comprises, a substance which would attack the glass, as, for example, by dissolving and carrying away alkali metal components of the glass.

In general, the initial wetting of the glass by placing the same in a saturated or super-saturated atmosphere is particularly suitable in cases where it is desirable to preserve the transparency of the glass as much as possible, as well as when it is not necessary to achieve a complete elimination of Newton rings.

The wetting liquid used may contain a surfactant for dissolving any traces of grease and promoting uniform wetting of the glass surface. The wetting liquid, e.g., water, or an organic solvent, may, for example, contain a commercial detergent based on sodium tripolyphosphate and containing traces of lauric ester, or an unctuous agent such as palm oil, etc.

If it is desirable to eliminate all specular reflection or to at least reduce such reflection as much as possible, as much wetting liquid should be removed as possible consistent with leaving a film of liquid on the surface of the glass. Therefore, while it may be satisfactory to apply the wetting liquid liberally to the surface when it is desirable just to eliminate Newton rings and thereby leave on the surface all liquid which will not actually drain off, it is preferable to remove more liquid than this so that the final residual film of liquid on the surface is only slightly perceptible, or is not perceptible at all on ordinary observation. This more drastic removal of fluid is particularly desirable if it is necessary to achieve substantial elimination of all spectral reflection. In practice, the draining of excess liquid is not particularly recommended as this can be detrimental to the uniformity of the treatment and indirectly cause lines to appear on the treated surface of the glass. It is better to remove excess liquid by mechanical means, e.g., a sponge, or squeegee, and/or evaporation. Thus the wetted glass sheet can be heated to a temperature of, e.g., 70° C. by means of steam-heated pipes, or by electrically heated tubes, until traces of moisture are no longer visible to the eye. The removal of the excess liquid preferably occurs progressively and uniformly and the evaporation can be easily controlled by appropriately controlling the humidity and temperature of the drying atmosphere. Excess liquid can be quickly and efficiently removed by means of a drying atmosphere comprising air with a humidity of 10%.

The next step in the method of the present invention following the wetting of the surface and removal of any excess wetting liquid, is the subjection of the surface to the action of a substance, or substances, which reacts chemically with the glass. This substance must impinge or form against the surface in the form of minute droplets. The droplets may, of course, include one or more ingredients in addition to the chemically active substance itself. The chemically active substance which may or may not be in a dissolved state can be atomized to form a mist, and the atomized substance may be entrained against the surface by the continuous carrier phase of the mist, said continuous phase being, for example, air. The atomization may be achieved by an atomizer operated by compressed air which projects the droplets against the surface to be treated. As an alternative, a stream of gas or vapor consisting of or containing the chemically active substance in the vapor phase may be directed against the surface as long as the droplets of the active substance are present, or form as the gas stream reaches the glass surface thereby ensuring that the gas does not dry the glass surface before the chemically active substance condenses and takes effect. This alternative method may be carried out by saturating or super-saturating the gas with the active substance such as by evaporating the substance in hot air and then cooling the air to or beyond the saturation point, thereafter further cooling the gas in immediate proximity to the surface, for example, by heat exchange. If a super-saturated system is formed so that it is in unstable equilibrium, further cooling may not be necessary since the equilibrium may be disturbed by physical contact with the glass surface. In any event, the cooling of the gas or its contact with the glass surface causes droplets to instantly form or to form in greater numbers and/or causes droplets already present to increase in size.

It is not essential for all of the chemically active substance brought into contact with the glass to contact the glass in the form of minute droplets. The continuous phase in which such droplets are present may consist of, or include, the same or a different substance which reacts with the glass. Accordingly, droplets of the chemically active substance may be entrained against the surface in a further quantity of the same substance in the vapor state, or in air containing said vapor. This procedure, however, is not preferred.

The size of the droplets acting on the glass surface is a factor which influences the final result. That is, condensing the chemically active substance from the gas stream in the immediate vicinity of the glass, the glass surface may be subjected to the action of droplets of a size larger than could be conveniently entrained by the gas along a horizontal path without any separation of the droplets from the gas stream by gravitation. On the other hand, it is necessary to avoid application of the chemically active substance to the glass surface in droplets of such quantity and size whereby all areas of the glass surface are equally affected by the active substance or the latter runs along the surface. The reason for this is because the chemical attack would not show itself by a pattern of spots distributed over the surface. A too liberal deposit of the chemically active substance on the surface can easily occur when the gas stream directed against the surface is in an unstable super-saturated condition because on cooling the whole quantity of the active substance which is in excess of the amount needed to saturate the gas instantaneously, condenses. However, the risk of droplets of the chemically active substance running along the glass surface can be reduced appreciably by treating the sheet glass in a horizontal position.

It has been found through experimentation that the size of the droplets of the chemically active substance impinging against the surface should preferably lie between certain limits. If the droplets are below a certain size, an opaline appearance tends to be imparted to the glass and its transparency is appreciably reduced. On the other hand, if the droplets are above a certain size, it is difficult to avoid their spreading and thereby causing the chemically active substance to flow in streams along the glass surface. In accordance with the method of the present invention, it is necessary to determine by simple tests the limits of the various factors which influence in any way the successful operation of the process, e.g., the size of the droplets of chemically active substance, the quantity of the chemically active substance used in a given treatment, the period of time of treatment as well as the temperature of the treatment. These variable factors and/or conditions may vary from case to case, depending inter alia on the chemical composition of the glass and the condition of the glass surface to be treated, e.g., whether iridescent, annealed or tempered. The more the glass surface is mehcanically and chemically resistant to attack by the chemically active substance, the more active this substance will need to be in order to achieve a required effect in a given time.

In general, the process may be satisfactorily carried out by applying the chemically active substance in the form of droplets whose diameters are between 30 and 250 microns, preferably between 50 and 200 microns. In accordance with the present invention it has been found that a sheet glass surface may be easily modified so that it reflects light only diffusely, without materially reducing the transparency of the sheet when using droplets whose diameters are between 30 and 250 microns. Moreover, if droplets covering a wider size are initially formed in a gas stream, it is possible to eliminate the droplets which are too small or too large before they reach the sheet glass. Thus the path of the gas stream and its velocity may be arranged so that the droplets above the required maximum size fall from the gas stream, e.g., into one or more receptacles. Deflectors can be used to promote this removal of large droplets. Furthermore, droplets below the required minimum size may be removed by cross-currents, e.g., by establishing across the main gas stream, approximately parallel with the glass surface to be treated, a gas current of sufficient velocity to entrain out of the main stream all particles which are below the required minimum size. When selecting particle sizes in this way, it is preferable to place the glass sheet in a vertical position and to direct the cross-current which, for example, may be a current of air at the same temperature as the main gas stream, downwardly across such main stream.

A simple alternative method of predetermining the size range of the droplets impinging on the glass is to use an atomizer nozzle designed to divide the liquid force through it into droplets within the required size range. One, or a plurality of spray guns, can be used for this purpose and they may be placed so as to spray the droplets uniformly over the whole surface to be treated. Also, it has been further found that the best results can be achieved when applying to the glass surface a mixture of droplets of different size ranges well spaced in the size scale, within the preferred ranges of 50 to 100 microns and 200 to 250 microns. The application of droplets within both of these ranges is recommended, particularly in cases wherein it is desirable to eliminate all specular reflection and Newton rings. The use of spray guns is very beneficial for achieving this kind of result because a combination of spray guns may be employed with spray nozzles of different designs or differently adjusted so that the size ranges may be accurately predetermined.

In principle any chemical compound which reacts chemically with the glass may be used as the chemically active substance. It is preferred, however, that an aqueous solution of hydrofluoric acid be used. It is not necessary when using hydrofluoric acid in the present invention to additionally use additives such as alkali metal fluorides as is needed when using the known dipcoating process hereinbefore described. Nevertheless, it is advantageous to employ in combination with the hydrofluoric acid a compound selected from the group consisting of fluorides, alcohols, mineral and organic acids, and surfactants. Specific examples of particularly suitable additives in these categories will hereafter be given. It is preferable to employ such additives in a proportion of from 0.5 to 50% by weight based on the weight of hydrofluoric acid solution. The advantages obtained by incorporating the additives are that the action on the glass occurs more quickly and proceeds more intensely in a given time. Moreover, incorporating certain types of additives into the liquid formed into droplets makes it easier to avoid the presence of droplets below a predetermined size, thereby resulting in a higher degree of isotropy of the treated glass sheet.

After allowing time for the chemical action to take place the surface of the sheet has to be treated to remove residual reactants, reaction medium, as well as reaction products. The action of the chemically active substance results in a colloidal solution of gel forming on the treated surface which may be easily removed by dipping the glass in ordinary water, distilled water, or a mixture of water, methyl alcohol and sulphuric acid (percentages 95:3:2). The reaction products may also be washed away and thereby removed by spraying the above-described washing liquid, or some other washing liquid over the glass surface. This procedure is preferable because in addition to being quicker, it also avoids any tendency for striae to appear on the surface of the sheet glass, such as may occasionally appear after dipping. Another method of removing residual products is to evaporate them by slightly heating the glass surface, e.g., by means of electric resistance heaters. This procedure is very suitable when the residual colloidal solution is quite small so that a whitish film is not noticeable when looking through the glass. After heating the glass sheet, it may be brushed and/or rinsed.

It is generally better to remove the reaction medium and reaction products from the glass surface before the chemical reaction upon the glass ceases. If the attack on the glass continues for too long, the surface of the glass will become grained and show signs of crystallization and the transparency may become impaired when the glass is viewed at an angle of approximately 30° to the normal to the glass surface. It has been found, in accordance with certain tests that have been conducted, that the method of the present invention can be performed within a wide range of temperature covering both the glass surface and the chemically active substance. The present method has been successfully performed when glass is at temperatures varying from 0° C. to 120° C. and when the chemically active substance is applied in a gaseous medium at temperatures varying between −10° and 100° C. The speed of the treatment increases with an increase of temperature. The glass is preferably treated at a temperature of from 50 to 70° C. It is surprising that if the treated glass shows defects such as striae bubbles or "hammering" effects, these defects are much less apparent after treatment has taken place between these particular temperature limits, even when looking through the glass at a large angle to the normal of the glass surface.

The length of time at which the chemical action is allowed to continue influences the proportion of the glass surface which will be covered by the chemically affected spots. In general, at least 50% of a glass surface should be covered by such spots if specular reflection is to be substantially eliminated. When the treated glass is examined under the microscope, the portions of the glass surface into which the substantially circular chemically affected spots do not extend appear quite smooth, or slightly dulled or stained; sometimes innumerable small rounded protuberances can be seen side by side inside certain areas.

The process of the present invention has not been found to produce any significant change in the mechical, chemical and thermal properties of the sheet glass, and, as already mentioned, the treatment can be effected without reducing the transparency of the treated glass. Moreover, the improvements in the optical properties resulting from the treatment have been found to persist during subsequent heat treatment and shaping of the glass. Accordingly, pieces of glass treated in accordance with the present invention which have been heated to 650° C. shaped into windshields and television screens and thereafter cooled to ordinary temperatures have not in any way had their power to reflect light diffusely impaired.

The present invention is useful for treating glass bearing marks of chemical attack such as are produced by using the method of the present invention and includes any articles of manufacture consisting of or comparing a piece or pieces of glass bearing such marks. Articles which may comprise such glass are, for example, television screens, protective plates for television screens, glasses for picture frames, glass plates for writing desks, watch and other instrument glasses, and bulls' eyes, etc.

The present invention covers, in addition to glass as such other material, that is, material other than glass bearing circular or substantially circular marks on at least one surface such that the configuration of such surface is a positive or negative replica of the configuration which can be imparted to a glass surface by treating it in accordance with the method of the present invention. Any firm material, in sheet form of any gauge, or in some other form, which may or may not be transparent having a surface so configured, can be used as a die or mold plate for forming a positive replica of a glass surface as it appears after treatment according to the present invention, as well as for forming another die or mold by means of which such a positive replica can be produced. For example, a glass sheet treated by the method according to the present invention whether flat or curved, can be used as a die for making a plaster cast from which a positive replica of the configured surface of the glass sheet can be produced on another material, e.g., a synthetic resin such as an acrylic resin, by pressure or heat and pressure. A piece of transparent thermoplastic material having a surface so configured will also have the power of diffusely reflecting light at such surface. Positive and negative replicas of a glass surface which has been treated in accordance with the present invention can also be produced by means of certain photographic processes, applied for instance, with photosensitive glasses.

Additional objects and advantages of the present invention will become apparent upon consideration of the following description when taken in conjunction with the accompanying drawings in which.

EXAMPLE I

Figure 1:
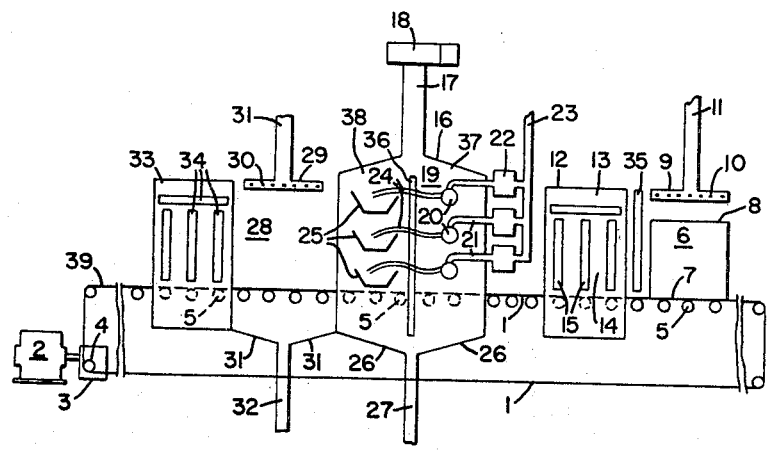
FIGURE 1 is a sectional elevational view of a plant for the continuous treatment of glass sheets.

An installation as illustrated in FIGURE 1 was used. A conveyor belt 1, which, like all other apparatus parts likely to come into contact with the chemically active agent, is made of polyvinylchloride, was driven by a motor 2 through a variable speed-reducer 3 and a roller 4. The conveyor belt 1 was guided and supported by a set of rollers 5. An upper conveyor belt was also provided but is not shown in the figure. The upper belt runs parallel with and is vertically spaced above the belt 1 so that glass sheets to be treated, located in a vertical position like the glass sheet 6 shown at the right hand end of the figure can be supported in that position by the upper reach of belt 1 and the lower reach of the upper belt, the belts being in contact with the bottom and top edges respectively of the sheets. In operation, the two belts were driven so that the reaches thereof which engage the glass sheets move from right to left and convey the sheets through successive treatment stations. The belts are 3 cm. thick and have a spongy texture so that they do not damage the glass sheets.

A sprayer 9 provided with orifices 10 was fed by a feed pipe 11 with a solution containing 98% by weight of distilled water, 1% oil and 1% of a detergent surfactant such as sodium tripolyphosphate. A tunnel chamber 12 was provided at its top part 13 and on its sidewalls 14 with infrared heating lamps 15, the aggregate power rating of which was 3 kw.

A second tunnel chamber 16 followed chamber 12 in the direction of the conveyance of the glass sheets. Chamber 16 was surmounted by a chimney 17 equipped with an exhauster 18 made of a plastic material Teflon. The products aspirated by the exhauster 18 were neutralized in an adjoining chamber (not shown).

Adjacent each of the sidewalls 19 of the tunnel chamber 16 which walls are disposed abreast of and parallel with the path of the glass sheets were thre atomizers 20. These atomizers were connected with a main compressed air source (not shown) by fed lines 21 and 23 and air pressure reducing valves 22, and were connected by conduits 24 with vessels 25 containing a 50% solution of industrial hydrofluoric acid with no additives. The atomizers work on the well-known ejector principle. The bottom of the tunnel chamber 16 was formed by two walls 26 sloping downwardly to the top end of a discharge pipe 27. To the left of the chamber 16 is a space 28 above which was a sprayer 29 which had orifices 30 which were fed via pipe 31 with rinsing liquid. The rinsing liquid drained onto inclined plates 31 and discharged through a discharge pipe 32. Following the spraying station 28 was a chamber 33 provided at its upper part and along its sidewalls with electric resistance heaters 34 with an aggregate power rating of 2 kw.

Between the first spraying station and the first tunnel chamber 12 was a partition 35. A further partition 36 was provided across the second tunnel chamber 16 midway between its entry and exit ends. The partitions 35 and 36 were walls which extend transversely of the path of the glass sheets and were provided with a vertical slot through which the glass sheets can pass. The entry and exit ends of each of the tunnel chambers 12, 16 and 33 were likewise closed by transverse walls with vertical slots for the passage of the glass sheets. It should be noted that the slots in the partition walls 35 and 36 and in the transverse walls at the entry and exit ends of the tunnel chambers also pass the lower reach of the upper conveyor belt (not shown) hereinbefore referred to and which holds the top edges of the glass sheets. All of the slots, with the exception of the slot in partition wall 35, also pass the upper reach of the conveyor belt 1.

The installation worked as follows: The lower belt 1 and the upper left belt (not shown) were driven so as to convey the glass sheets from right to left at a speed of 2 meters per minute. Each sheet to be treated was moved into position on part 7 of the conveyor 1, i.e., into the position which is occupied by glass sheets 6 in the drawing. The sheet was first generously wetted by a rinsing solution which was discharged from sprayer 9 at a rate of 20 liters per minute. Then as the sheet 6 was advanced by the conveyor belts, it passed through the slot in the partition wall 35 into the tunnel chamber 12. The partition wall 35 prevents rinsing solution being sprayed into this chamber from the sprayer 9. In chamber 12, excess rinsing liquid was evaporated from the glass sheet. When the sheet left the chamber 12 the residual quantity of solution on its surfaces was about 1 gr./m.². The glass sheet 6 was one meter square. As the glass 6 left part 7 of the conveyor belt 1, another sheet was moved into that position so that sheets could follow one another in close succession through the installation.

After removal of the excess wetting liquid, glass sheet 6 entered the tunnel chamber 16. Air was continuously drawn into this chamber through the slots in its entry and exit walls, by the exhauster 18. The air currents flowed upwardly along the major surfaces of the glass sheet to the chimney 17. The quantity of air thus flowing through the chamber was 2 m.³ per minute. In the entry compartment 37 of chamber 16 i.e., in the compartment on the right hand side of the partition wall 36, a mixture of air and hydrofluoric acid solution was delivered by the atomizers 20 located on opposite sides of the glass sheet. The air was supplied from a source (not shown) at a pressure of 3 kg./cm.² and this pressure was reduced to 100 gr./cm.² by the pressure reducing valves 22. The quantity of acid solution delivered by the six atomizers 20 was 3 liters per hour. The diameters of the liquid droplets formed cover the range from 20 to 400 microns but the aforesaid upward air currents which flow across the paths of the droplets discharging from the atomizers entrained with them to the chimney 17 the droplets below 100 microns in diameter, whereas the droplets having a diameter which exceeds 200 microns fell by gravity onto the inclined bottom walls 26 and discharged through pipe 27. Therefore, only the droplets of acid solution having diameters which lie between 100 and 200 microns were entrained against the surfaces of the glass sheet 6. If it is desired to treat only one face of this sheet, the three atomizers 20 located to one side of the sheet path can be put out of operation. In such cases it is advisable for that surface of the glass sheet which is not to be treated to be provided with an adherent coating, e.g., a coasting of a liquid silicone plastic material.

In the specific example set forth, the pressure drop in the tunnel chamber 16 was equal to 2 to 3 mm. of water which is sufficient to substantially prevent a corrosive product from being discharged into the atmosphere.

The partition wall 36 in chamber 16 shielded the exit compartment 38 was such that each portion of the surfaces of the sheet 16 contacted by the droplets of acid solution passed progressively through the slot in this partition wall into the exit compartment, and progressively passed through this compartment to the exit end of the chamber. The horizontal dimension of the exit compartment 38 was such that each portion of the treated glass surfaces took 2½ minutes to move through this compartment and reach the second spraying station 28. Each surface portion was therefore subjected to the action of the contacting acid droplets for 2½ minutes.

At station 28 the sheet was generously sprinkled with ordinary water, delivered at the rate of 30 liters per minute by the sprayer 29.

On leaving the spraying station 28, the glass sheet 6 entered the tunnel chamber 33 in which the sheet was dried for approximately 2 minutes. The glass 6 was finally delivered to the end 39 of the conveyor from which the sheet was removed.

The temperature of the glass sheet 6 at the moment of treatment in the tunnel chamber 16 was 35° C., this being the temperature measured on a surface of the glass sheet. The temperature of the air conveyed by the pipes 21 and of the acid solution flowing along piper 24 was 20° C. which was also the same temperature as the air passing through the chamber under the action of the ventilator 18.

Glass sheets treated in accordance with this example were capable of reflecting the light diffusely and were as transparent as they were prior to the treatment. Any image or photo, placed at a distance at least equal to 2 cm. from one face of one of the treated sheets appeared without any distortion or lack of sharpness when viewed through the glass sheet along any horizontal line of sight from 0 to 70° with respect to the normal to the sheet, assuming that the latter is located vertically and that its orientation is the same as when passing through the illustrated installation. The sharpness was not found to be so good when the image was viewed through the so-oriented sheet at an angled line of sight in a vertical plane. When the sheet was examined through the microscope, it was observed that the affected spots with diameters in the vicinity of 200 microns were not perfectly circular but slightly elliptical, the major axes of the ellipses running in the top to bottom direction of the sheet.

EXAMPLE II

Example I was repeated in several tests with, however, the modification that in each test 2% by weight of an additive was added to the solution of hydrofluoric acid. The following additives were used in the successive tests: methyl alcohol, ethyl alcohol, glycol, glycerine, sulphuric acid, ammonium bifluoride, sodium tripolyphosphate, tartaric acid, acetic acid, a mineral oil, vegetable oil.

It was observed that when such additives were used, the quantity of solution required in order to obtain comparable results to those obtained in Example I was 2.7 liters per hour instead of 3 liters per hour. Moreover, the sharpness of an image viewed through a glass sheet treated according to the present example did not depend on the orientation of the line of sight with respect to the orientation of the glass sheet. The sheet showed a perfect isotropy examined with a microscope. A glass sheet treated in accordance with this example showed marks of chemical attack in the form of depressions which are perfectly circular in plan. Similar results were obtained by using two or more of the above-mentioned additives in the same solution.

EXAMPLE III

The process of Example I was repeated with, however, the modifications that the glass sheet 6 was dried in tunnel chamber 12 to such an extent as to leave a quantity of solution adhering to the glass sheet equal to 5 gr./m.² and that the solution atomized by the atomizers 20 was a solution of hydrofluoric acid with a concentration of 70% by weight. The treated glass sheet reflected light diffusely. The sharpness of an image that was placed at least 1.5 cm. from the glass sheet and viewed through the sheet, was excellent. The markings on the treated surfaces of the glass sheet, examined through a microscope, were more pronounced, the depressions being deeper, and Newton rings were completely or almost completely eliminated.

Figure 2:
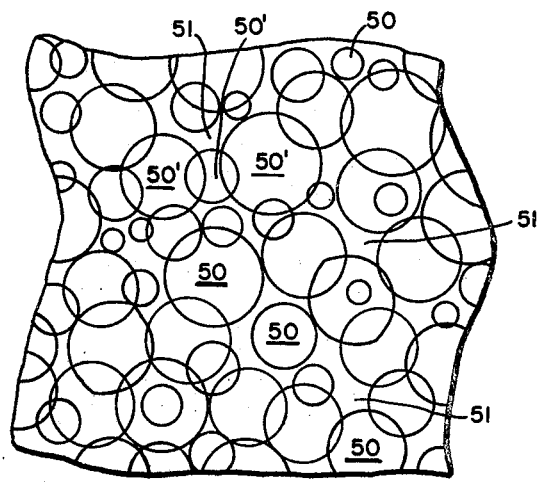
FIGURE 2 is an enlarged schematic view of a face of a glass sheet after treatment in accordance with the present invention.

FIGURE 2 represents the surface of a glass sheet according to the invention magnified one hundred times.

The surface bears numerous depressions, 50, 50' which are nearly circular in plan and vary in diameter from 40 to 200 microns. The depressions are a few microns in depth. A large proportion of the depressions overlap other depressions as do the depressions marked 50'. The depressions of different diameters are randomly distributed. Some of the depressions or recesses appear as if they had been formed with a flat-ended drill, while others are concave, with comparatively large radii of curvature. The surface in some of the areas looks as if it were polished but in other of the areas, the surface exhibits innumerable small juxtaposed spots like the surface of an orange skin, such spots being of the order of a few microns in height as well as in diameter.

The portions 51 of the glass surface, which are free from depressions or recesses, look as if the surface in these areas were perfectly polished and as if it had not been subjected to any treatment. However, in some sheets treated in accordance with the present invention, it was found that the portions 51 of the surface appear as if the surface at these portions had been made dull. This latter feature appears more frequently when the glass sheet has been dried to a particularly marked extent before being subjected to the chemical action of the droplets. In such cases, the reduction in the occurrence of Newton rings is less pronounced but specular reflection is substantially entirely eliminated.

What is claimed is:

1. A method of modifying the light-reflecting property of a glass surface comprising uniformly wetting the glass surface with a wetting liquid and removing any excess wetting liquid to produce a uniform film, causing minute droplets of a substance, which reacts chemically with the glass, to impinge or form against said surface while said surface is wet but bears no excess wetting liquid, thereafter maintaining the droplets in contact with said surface until a chemical reaction between said substance and said glass produces marks of chemical attack at a multiplicity of spots over said surface which marks can be seen when the surface is viewed under a microscope and then removing reaction medium and reaction products from said surface, the minute droplets ranging in size from those having a mean diameter of 10 microns up to, but not including, that at which said droplets will run along the glass surface.

2. The method of claim 1 wherein the wetting liquid comprises distilled water.

3. The method of claim 1 wherein the wetting liquid contains a surfactant.

4. The method of claim 1 wherein the wetting of said surface is achieved by bringing the glass surface into contact with a gas saturated or supersaturated with the wetting liquid.

5. The method of claim 1 wherein the droplets are formed by cooling the gas in the immediate vicinity of the glass surface during flow of the gas against said surface.

6. The method of claim 1 wherein the substance which reacts chemically with the glass surface is entirely in the form of droplets ranging in size from 30 to 250 microns.

7. A process according to claim 1 wherein an aqueous solution of hydrofluoric acid is the substance which reacts chemically with the glass.

8. A method according to claim 1 wherein said droplets also contain one or more additional compounds enhancing the reaction of the glass surface with the substance.

9. The method of claim 8 wherein said one or more additional compounds are selected from fluorides, alcohols, organic acids, mineral acids, and surfactants.

10. The method of claim 6 wherein the fraction of the substance which reacts chemically with the glass surface other than that composed of liquid droplets having diameters between predetermined limits is eliminated.

11. A product produced according to the method of claim 1.

References Cited

UNITED STATES PATENTS

| 2,461,840 | 2/1949 | Nicoll | 156—24 XR |
| 3,374,130 | 3/1968 | Junge et al. | 65—31 XR |

S. LEON BASHORE, Primary Examiner

JOHN H. HARMAN, Assistant Examiner

U.S. Cl. X.R.

65—31; 117—54, 124, 118; 156—15, 24